United States Patent Office 2,872,905
Patented Feb. 10, 1959

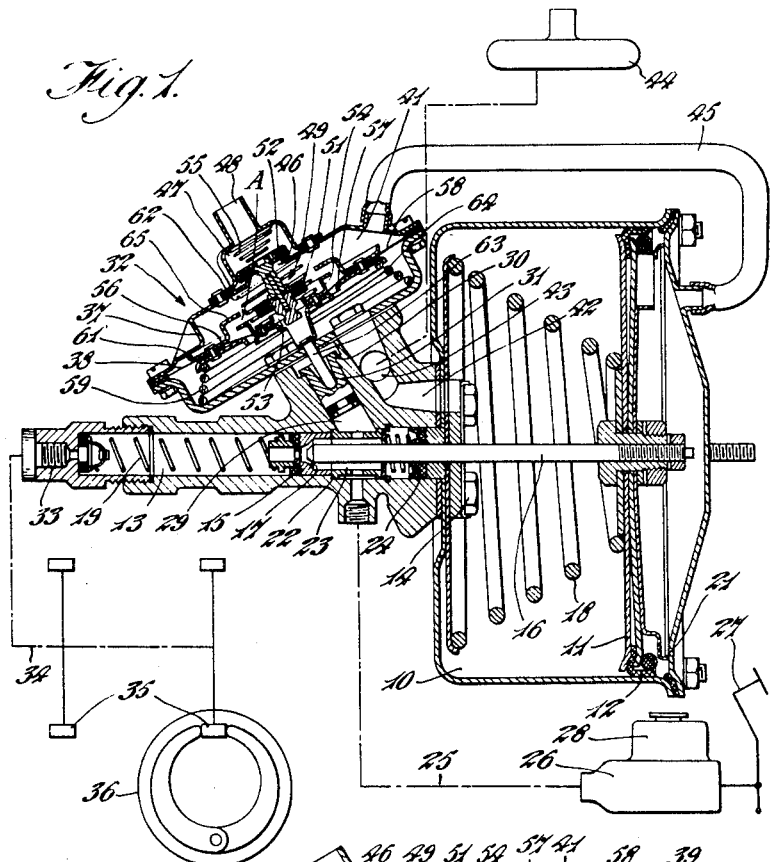
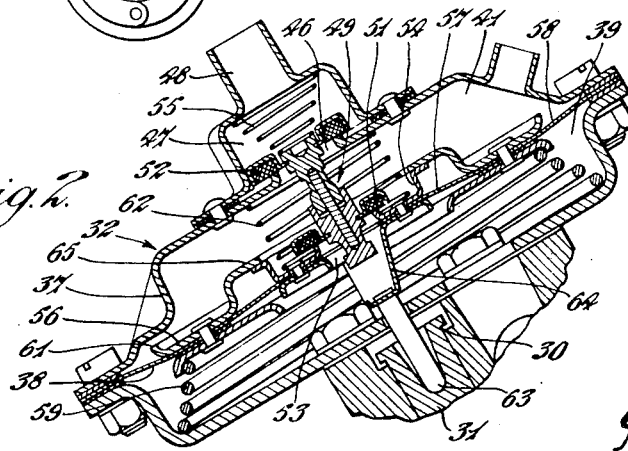

2,872,905

VALVE DEVICES FOR CONTROLLING SERVO-DEVICES OF THE DIFFERENTIAL AIR PRESSURE TYPE

Leslie Cyril Chouings, Leamington Spa, England, assignor to Automotive Products Company Limited, Leamington Spa, England Application June 24, 1957, Serial No. 667,600

Claims priority, application Great Britain June 25, 1956

1 Claim. (Cl. 121—46.5)

This invention relates to valve devices for controlling servo-devices of the differential air pressure type such as are used in association with liquid pressure systems, for example liquid pressure braking systems.

In servo-devices of the so-called "vacuum suspended" type, in which a piston is movable in a vacuum cylinder both ends of which are normally connected to a source of suction, one end being isolated from the source of suction and connected to atmosphere when the servo-device is required to operate, it is well known to provide a valve device in which valve operating pressure produced by a primary operator-operated liquid pressure master cylinder is opposed by the action on a diaphragm of an air pressure differential corresponding to that acting on the piston in the vacuum cylinder, the said air pressure differential tending to return the valve device to a lapped position. Such a valve device is hereinafter called "a valve device of the kind referred to."

The object of the present invention is to provide an improved valve device of the kind referred to for a servo-device as defined in the last preceding paragraph, which operates to bring the servo-device into operation when the pressure produced by the pedal-operated master cylinder is at a low value.

According to the present invention, the diaphragm is so arranged that so long as the difference between the air pressure acting on opposite sides thereof remains below a predetermined value it acts on only a part of the area of the said diaphragm to oppose operation of the valve device by the liquid pressure from the operator-operated master cylinder, increase of the said air pressure difference to a value above the predetermined value automatically causing the full area of the diaphragm to become effective to oppose the said liquid pressure.

Further, according to the invention, in a valve device of the kind referred to the diaphragm which constitutes a partition between first and second chambers each connected to one end of the vacuum cylinder, the first chamber being also connected to a source of suction, is apertured at its centre to connect the two chambers, the said aperture being controlled by a valve head movable as one with a second valve head controlling a port connecting the second chamber to the atmosphere the diaphragm has fixed to it a rigid ring dividing the said diaphragm into inner and outer portions, said ring being urged by a spring into engagement with an abutment in the second chamber and the inner portion of the diaphragm being urged by a lighter spring in the opposite direction, the inner portion of the diaphragm being movable by operator-applied liquid pressure against the lighter spring to cause the valve heads to respectively close the aperture in the diaphragm and open the port leading to the atmosphere, and the port leading to the atmosphere, and the atmospheric air thus admitted to the vacuum cylinder and the second valve chamber acting on the diaphragm in opposition to the said liquid pressure to allow the second valve head to close the port leading to the atmosphere under the influence of a return spring, the air pressure being effective only over the area of the inner portion of the diaphragm until it attains a value sufficient to overcome the spring acting on the rigid ring.

The invention is hereinafter described with reference to the accompanying drawings, in which:

Figure 1 is a sectional elevation of a servo-device embodying a valve device according to the invention, there being shown diagrammatically the other parts of a liquid pressure braking system in which the servo-device is incorporated and Figure 2 is a section of the valve device on a larger scale showing the parts thereof in a different position.

Referring to Figure 1, the vacuum servo-device comprises a vacuum cylinder 10 in which is slidably mounted a piston 11 provided with a peripheral packing ring 12, and a liquid pressure master cylinder 13, secured by bolts 14 to one end of the vacuum cylinder 10, a piston 15 mounted in the master cylinder 13 being operable by the piston 11 through a thrust rod 16. The piston 15 has a central aperture 17 adapted to be closed by the front end of the thrust rod, and the two pistons 11 and 15, when the device is idle, are urged respectively by return springs 18 and 19 against abutments at 21 and 22 so positioned one relative to the other that the front end of the thrust rod is spaced from the aperture 17 in the piston 15, leaving a free passage through the said aperture.

A space 23 in the master cylinder 13 behind the piston 15 is closed at its rear end by a packing 24 surrounding the thrust rod 16, and is connected by a conduit 25 to a liquid pressure master cylinder 26 operated by a foot-pedal 27, the master cylinder 26 communicating in the usual way, when the piston therein is retracted, with a liquid reservoir 28. A cylinder 29 opening into the space 23 has slidable therein a piston 31, the cylinder 29 and piston 31 constituting a motor device for operating a valve device, generally indicated at 32, controlling the vacuum cylinder 10. The piston has a flange adapted to engage a shoulder 30 in the cylinder and limit movement of the piston towards the space 23. The liquid pressure master cylinder 13 has its outlet 33 connected by a conduit system 34 to motor cylinders 35 operating brakes, one of which is shown as a shoe brake at 36. Obviously a greater or less number of brakes can be connected to the conduit system 34, and the said brakes may be of any desired type, including disc brakes.

The valve device 32 comprises a hollow body 37 divided by a flexible circular diaphragm 38 into two chambers 39 and 41 each bounded by one side of the diaphragm 38 and one end wall of the body 37. The chamber 39 is permanently connected by a passage 42 to the forward end of the vacuum cylinder 10, a branch passage 43 leading to a source of suction such as the inlet manifold of the engine of a vehicle on which the brake system is mounted, the said inlet manifold being shown at 44. The chamber 41 is connected by a conduit 45 to the rear end of the vacuum cylinder 10.

A port 46 in the end wall of the chamber 41, co-axial with the diaphragm 38, opens into a third chamber 47 which is connected to the atmosphere through an orifice 48. A movable valve member 49 has two spaced co-axial disc-shaped heads 51 and 52 which co-operate respectively with a port 53 at the centre of the diaphragm 38 and with the port 46, the port 53 being formed in a rigid circular plate 54 secured to the centre of the diaphragm, and each of the said ports being surrounded by a rim adapted to be engaged by a resilient seating washer on the co-operating head. The valve member 49 is urged by a spring 55 in the chamber 47 in a direction to seat the head 52 on the rim around the port 46. The diaphragm 38 which is clamped at its outer edge to the wall of the valve body, is divided by a rigid ring 56 into inner and outer portions 57 and 58, and a spring 59 in the chamber 39 urges a flange 61 on the said ring into engagement with the end wall of the chamber 41. The plate 54 is acted on by another spring 62 in the chamber 41. The spring 62, which is weaker than the spring 59, urges the plate 54 away from the end wall of the chamber 41, but is unable to displace the ring 56 and outer portion 58 of the diaphragm owing to the greater strength of the spring 59. The spring 62 holds the rim around the port 53 away from the valve head 51. A push rod 63, acted on by the piston 31, acts on a bracket 64 secured to the plate 54, pressure in the cylinder 29 thus acting to urge the plate 54 towards the end wall of the chamber 41. The inner edge of the rigid ring 56 is offset away from the diaphragm 38 as shown at 65, and the outer edge of the plate 54, which is similarly offset, is overlapped by the said edge 65 so that relative movement between the ring 56 and the plate 54 is limited.

The parts are shown in Figure 1 in the positions they take up when the system is not being operated. The valve head 52 is seated on the rim around the port 46, and the central part 57 of the diaphragm 38 is held by the spring 62 in a position such that the piston 31 engages its stop 30 and the rim around the port 53 is spaced from the valve head 51. The flange 61 is held against the wall of the chamber 41 by the spring 59. Thus the air inlet 48 is closed, and both ends of the vacuum cylinder 10 are connected to the source of suction.

Pressure produced in the master cylinder 26 by operation of the pedal 27 acts on the piston 31, and also acts in the motor cylinders 35 to exert a thrust tending to spread the brake shoes. This pressure overcomes the spring 62 and moves the central part 57 of the diaphragm 38 until the rim around the port 53 engages the valve head 51, thus cutting off the rear chamber of the vacuum cylinder 10 from the suction source. Further increase in the pressure produced by the master cylinder 26 moves the valve head 52 off the rim around the port 46, and admits atmospheric air to the rear chamber of the vacuum cylinder. The piston 11 is thus moved forwardly, the thrust rod 16 closes the aperture 17 in the piston 15 of the servo-operated master cylinder 13, and pressure is built up in the said cylinder 13 by the air pressure acting in the vacuum cylinder. The air pressure acting on the piston 11 of the vacuum cylinder also acts in the chamber 41 on the diaphragm 38, but, until the said air pressure builds up to a value sufficient to overcome the spring 59, it is effective to oppose the thrust exerted by the piston 31 on the diaphragm 38 only over the area of the central part 57 of the latter. The reaction thrust tending to re-seat the valve head 52 is therefore maintained at a comparatively small value, and pressure is able to build up rapidly in the rear end of the vacuum cylinder, so that the servo-assistance rapidly becomes effective to apply the brakes. The movement of the valve head 52 away from the port 46 is limited by engagement of the outer edge of the plate 54 with the offset inner edge 65 of the ring 56, and, when the air pressure acting in the chamber 41 becomes sufficient, acting over the whole area of the diaphragm 38, to overcome the spring 59, the flange 61 moves away from the wall of the chamber 41, and the air pressure acting over the whole area of the diaphragm opposes the liquid pressure acting in the cylinder 29 and tends to shut off the air inlet, so that the parts assume the position shown in Figure 2.

Thus the reaction thrust tending to shut off the air inlet is increased in relation to the air pressure when the latter reaches a predetermined value, dependent on the strength of the spring 59, and once that pressure has been reached, the control is highly sensitive and the degree of breaking produced is quickly and accurately responsive to variations of the pressure produced in the primary master cylinder. At the lower pressures, the control is less sensitive, but the servo device is brought into operation with very little time lag.

I claim:

In a fluid pressure system control valve mechanism of the type described; a casing, a diaphragm mounted in the casing and separating the casing into a first and a second chamber, each of said chambers being connected to one end of a vacuum cylinder, said first chamber also being connected to a source of suction, said diaphragm being provided at its center with an aperture to interconnect the two chambers, a first valve head controlling said aperture, a second valve head movable as a unit with the first valve head, said second chamber having a port connecting said chamber to the atmosphere with the port being controlled by the second valve head, a rigid ring connected to said diaphragm and dividing it into inner and outer concentric portions, an abutment in the second chamber, a spring urging said ring into engagement with the abutment, a lighter spring acting on the inner portion of the diaphragm to urge it in the opposite direction, the inner portion of the diaphragm being movable by an applied liquid pressure against the lighter spring to cause the valve heads to close the aperture in the diaphragm and open the port leading to the atmosphere with the atmospheric air thus admitted to the second chamber acting on the diaphragm in opposition to the liquid pressure to allow the second valve head to close the port leading to the atmosphere under the influence of a return spring, the air pressure being effective only over the area of the inner portion of the diaphragm until it attains a value sufficient to overcome the spring acting on the rigid ring and a rigid plate secured to the center of the diaphragm and overlapped by the inner periphery of the rigid ring, the overlapping portions providing for positive transmission of thrust exerted by the air pressure on the outer portion of the diaphragm to the rigid plate.

References Cited in the file of this patent

UNITED STATES PATENTS

| | | |
|---|---|---|
| 2,259,809 | Freeman | Oct. 21, 1941 |
| 2,393,524 | Fant | Jan. 22, 1946 |
| 2,631,433 | Thomas | Mar. 17, 1953 |
| 2,787,122 | Price et al. | Apr. 2, 1957 |
| 2,818,710 | Price | Jan. 7, 1958 |